(12) United States Patent
Kelleher

(10) Patent No.: US 8,181,381 B1
(45) Date of Patent: May 22, 2012

(54) COMPACT FLEXIBLE STAND-UP FISH FIGHTING HARNESS SET

(76) Inventor: Thomas Joseph Kelleher, Corona del Mar, CA (US)

( * ) Notice: Subject to any disclaimer, the term of this patent is extended or adjusted under 35 U.S.C. 154(b) by 0 days.

(21) Appl. No.: 13/134,590

(22) Filed: Jun. 10, 2011

Related U.S. Application Data

(60) Provisional application No. 61/403,200, filed on Sep. 13, 2010.

(51) Int. Cl.
*A01K 97/00* (2006.01)

(52) U.S. Cl. .............. 43/21.2; 224/922; 224/200

(58) Field of Classification Search .............. 43/21.2; 224/922, 103, 200, 201, 259, 260, 261; 190/1, 190/102
See application file for complete search history.

(56) References Cited

U.S. PATENT DOCUMENTS

| | | | |
|---|---|---|---|
| 4,817,323 A | 4/1989 | Braid | |
| 4,828,152 A | 5/1989 | Pepping | |
| 4,858,364 A | 8/1989 | Butts | |
| 5,738,257 A * | 4/1998 | McConnell | 224/200 |
| 5,855,086 A * | 1/1999 | Pandeles | 43/21.2 |
| 5,953,846 A * | 9/1999 | Shelton | 43/21.2 |
| 6,141,898 A * | 11/2000 | Shelton | 43/21.2 |
| 6,237,821 B1 | 5/2001 | Owen | |
| 6,591,542 B1 | 7/2003 | Jordan | |
| 6,869,146 B2 | 3/2005 | Gollahon | |
| 7,765,732 B1 | 8/2010 | Canevari | |
| 2004/0245305 A1 * | 12/2004 | Garcia | 224/661 |

* cited by examiner

*Primary Examiner* — Kimberly Berona
*Assistant Examiner* — Joshua Huson

(57) ABSTRACT

This compact flexible stand-up fish fighting harness set (Harness Set) embodies various adjustable straps, belts and other connections which are either directly attached to a rigid fishing rod gimbal receiver with flexible upper leg supports, or to the fishing reel lugs. Harness Set unites angler and fishing rod and reel rig (Rig) when they are under pulling stress of fighting a large game fish (Fish). Harness Set frees angler's arms, hands and lower back from pulling on fishing rod while drawing on angler's greater legs strength of quadriceps muscles and body weight to leverage said fishing rod. Harness Set differs from other harness and gimbal receiver designs in several significant features. Contoured and cushioned leg supports conform to angler's thighs, but are sufficiently flexible to enable an angler to walk sideways (to follow Fish) while maintaining great pressure against Fish. Leg supports are angularly adjustable on the gimbal receiver base to comfortably match angler's stature and stance. A cushioned rump-to-reel strap transfers leg leverage and body weight to Rig, as angler drops into semi-sitting position and then reels against game fish as angler returns to standing upright; while always maintaining steady pulling pressure against Fish. Harness Set also benefits from groin straps and suspenders strap (s), and an accessory fishing rod butt extension.

4 Claims, 5 Drawing Sheets ative mouth. This often creates the most strenuous part of any substantial fish fight. An "extension strap" is added to the Harness Set embodiment to ease such strenuous fish fight actions. The extension strap transfers some fish fight leverage from the rod-and-reel rig to a sturdy boat deck rail. Simultaneously, and importantly, the extension strap relieves or eliminates some considerable pressure to an angler's groin area, while still allowing the angler to reel-in the fish without undue stress or strain.

COMPACT FLEXIBLE STAND-UP FISH FIGHTING HARNESS SET

CROSS-REFERENCE TO RELATED APPLICATIONS

This application claims the benefit of provisional patent application Ser. No. 61/403,200, filed Sep. 13, 2010 by the present inventor.

REFERENCES CITED

By USPTO Numbers

U.S. Patents

| U.S. Pat. No. | Issued | Patentee | U.S. Classification(s) |
|---|---|---|---|
| 3,115,997 | December 1963 | Hengst | 224-5 |
| 4,817,323 | April 1989 | Braid | 43/21.2 |
| 4,828,152 | May 1989 | Pepping | 224/200; 224/253; 224/907; et al |
| 4,858,364 | August 1989 | Butts | 43/21.2; 224/200; 224/922 |
| 5,738,257 | April 1998 | McConnell | 2/51; 224/200; 224/666; et al |
| 5,953,846 | September 1999 | Shelton | 43/21.2 |
| 6,237,821 | May 2001 | Owen | 43/21.2; 224/200 |
| 6,591,542 | July 2003 | Jordan | 43/21.2; 224/922 |
| 6,869,146 | March 2005 | Gollahon | 182/235; 182/3; 297/468; et al |
| 7,621,066 | November 2009 | Mathison | 43/21.2; 224/200 |
| 7,765,732 | August 2010 | Canevari | 43/21.2; 224/5 |

Foreign Patent Documents

None

FIELD OF THE INVENTION

This embodiment is a combination of new and prior art, creating for an angler a significant improvement to mobile, comfortable, and hands-free fighting and retrieving of large game fish in a stand-up position using a fishing rod and reel aboard a sport fishing boat. This embodiment reduces or avoids uncomfortable and stressful strains of the angler's arms and back muscles. An added device provides increased leverage of the angler's fishing rod against the fishing boat deck rail, while reducing groin discomfort, at an advanced stage of the fish fight.

BACKGROUND OF THE INVENTION

Some prior art stand-up fish fighting harness devices cause strenuous arms and lower back exertions as well as uncomfortable pressure points on parts of an angler's quadriceps muscles. Some of prior art, for example, Braid, U.S. Pat. No. 4,817,323, and Pepping, U.S. Pat. No. 4,818,152, harnesses and fishing rod belt plates, require hand, arm, and lower back pulls against a fishing rod. And loose ends of belts and straps of such prior and similar art are also difficult and possibly dangerous for an angler to handle. Securing said prior art loose straps may require taping or tying them, as with the "Smitty-OTR" device. The subject Harness Set differs from other harness designs in several significant features: removing specific strenuous, uncomfortable and potentially unsafe deficiencies; by comfortably drawing on an angler's natural legs strength and body weight, yet freeing the angler's hands and arms; and securing loose ends of belts and straps.

SUMMARY OF THE INVENTION

Left and right quadriceps supports are contoured and cushioned to comfortably press against an angler's quadriceps muscles, but are sufficiently flexible to enable the angler to safely walk sideways (to follow a fish) while maintaining great hands free pressure against a fish. Contoured, cushioned quadriceps supports are angularly adjustable to comfortably flex and match an angler's stance and stature. The quadriceps devices support a butt plate and gimbal system and add to fish fighting comfort and endurance. This embodiment forms the foundation of a safe, comfortable but sturdy triangular fish fighting structure.

An adjustable, cushioned "rump-to-reel" strap transfers leg leverage to a rod and reel rig as said angler drops into a semi-sitting position, then reels against the fish as the angler returns toward a standing position. By rocking in a repetitive and slow motion, the angler creates a strong hands-free, safe and powerful pulling pressure against the fish.

A pair of groin straps secures said rump-to-reel strap to below the angler's buttocks for maximum fishing rod leverage, and virtually assures that the rump-to-reel strap will not ride up above the lower portion of the angler's rump. Such individual angler's physiology serves to control and maintain the designed integrated strength of said Harness Set.

A rigid but light-weight rod butt plate and gimbal device, attached to the cushioned quadriceps leg butt plate supports, is suspended from a strong, adjustable waist belt.

A suspenders strap engaged to quick release clips on said rump-to-reel strap increases leveraged pull exerted against an angler's fishing rod. In addition, said suspenders strap promotes an angler's desired upright fish-fighting posture to an extent of angler being able to watch the fishing rod's flex. Some prior art requires bending at one's back and even looking downward, generally reducing the efficacy of stand-up harness fishing, while unnecessarily tiring upper back muscles. Hand and arm pulling against a fishing rod, common to several prior art embodiments, further exacerbates an angler's fish fighting fatigue. Said Harness Set overcomes those deficiencies.

Said suspenders strap, alternatively clipped to loops on the Harness Set drop straps, transfers a portion of the fishing rod and reel rig's weight to an angler's shoulders and also may compensate for some anglers' greater abdominal girths which could otherwise cause said waist belt to sag. A sagging waist belt reduces the efficiency otherwise gained in this Harness Set embodiment. An additional, preferred alternative use of said suspenders strap is to add a set of additional adjustable strap extensions to provide simultaneous connections to said quick release clips and to said drop strap loops, thereby capturing both the increased fishing rod leverage along with a maintaining a preferred adjustable waist belt positioning.

Generous uses of belt attachment materials, e.g., hook and loop ("Velcro"), and friction belt buckles allow quick Harness Set adjustments to match various angler physiques and fishing rig dimensions; while providing security for otherwise loose ends of belts and straps. (See aforementioned criticism of some prior art.) Wing nuts are recommended for Harness Set fasteners, allowing simple, convenient modifications of structural components to conform to individual anglers' stances and statures.

As frequently happens in giant blue or yellow finned tuna and some marlin fishing fights, a fish descends to sometimes great depths after initially making one or more long surface runs, and the fish must be reeled back to the surface. An angler then frequently transfers the fish-fight to the fishing boat deck rail and leverages the fishing rod and reel rig against the fish's resistance. Prior art leads anglers to uncomfortably straddle and sit down on their fishing rod butts. A rod butt extension tube, included in said Harness Set, serves advantages to the angler at this stage of "lifting" the resisting fish, by temporarily enlarging and extending the fishing rod butt diameter and length, while reducing discomfort to the angler's groin area and adding leveraging length to the fishing rod butt. Such "rail fishing", however, is presently not I.G.F.A. approved.

Said Harness Set components are significantly compact and lightweight, yet the components are sufficiently durable to withstand prolonged, powerful game fish struggles. The Harness Set embodiment is suitably worn while kite fishing, chunk fishing, or live bait fishing; all fishing methods familiar to big game fish anglers. Said embodiment has been successfully field tested in prototype forms. Said embodiment may be comfortably and continuously worn for many hours, or easily partially or completely removed, when not fishing.

BRIEF DESCRIPTION OF THE DRAWINGS

Closely related figures have the same number but different alphabetic suffixes.

DETAILED DESCRIPTION

Buckles and clips are commonly available hardware, comprising marine durable brass, bronze or stainless steel; or of high strength and durable graphite and resin composites. Belts and straps are commonly available marine durable nylon web materials, mainly having a high tensile strength; belts, straps and other components may be monochrome or colorful.

Permanent belt and strap connections and cushioning may be sewn-in or otherwise permanently affixed, comprising suitable adhesives, thermal bonding, rivets or other. Adjustable strap connections (comprising Velcro or similar) may be sewn-on or otherwise affixed with marine durable permanent adhesives, rivets or other connections. Bolts, washers, and wing-nuts (or similar) are commonly available and should be stainless steel or similar grade material, to avoid weathering and corrosion.

Some Harness Set components may be manufactured by factory metallic milling or various plastics injection molding or other thermal processes.

Cushioning materials, comprising flexible, dense and marine durable materials, such as but not limited to weather durable deep cut pile carpeting or closed cell foam.

Said Harness Set invention is comprised of all components described in FIG. 1 through FIG. 6 inclusive.

Figure 1:
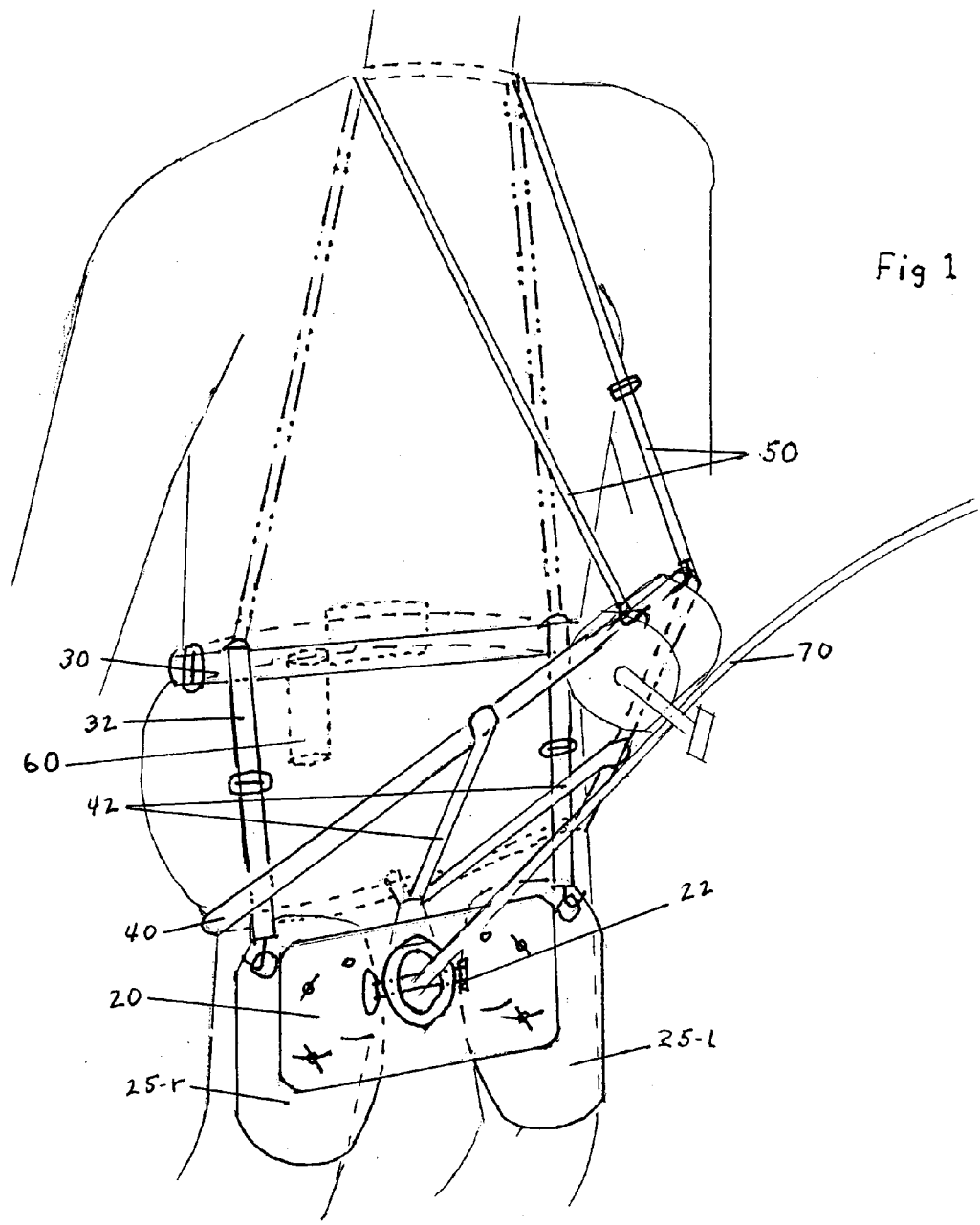
FIG. 1 shows an isometric view of a complete Harness Set in use by an angler.

Now Examining:

FIG. 1, an overall diagram illustrating the components of said Flexible Compact Stand-up Fish Fighting Harness Set in use on an angler, comprising:

A rigid rod butt plate 20 and a gimbal cup 21 with a gimbal stabilizing device 22, suspended on drop straps 32 from a waist belt 30, and supporting a fishing rod and reel rig 70. Said fishing rod and reel rig is leveraged by a rump-to-reel strap 40 as stabilized by a pair of groin straps 42. Said fishing rod and reel rig is further stabilized and supported by a suspenders strap 50. A combination of belts and straps integrates the rod butt plate and gimbal device, and attached cushioned quadriceps leg braces 25-*l* and 25-*r*, into a strong and durable fish fighting harness embodiment.

Figure 2A:
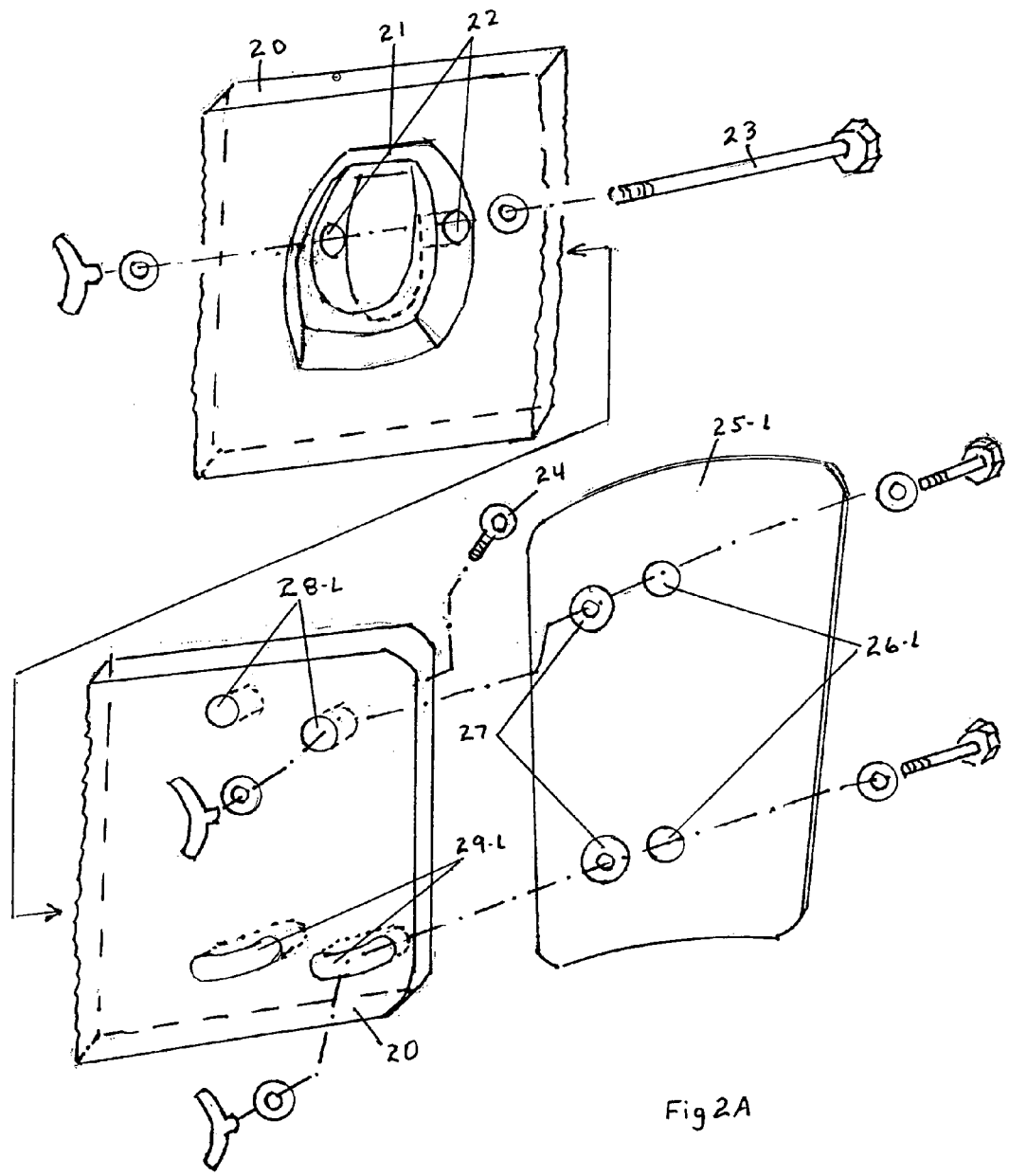
FIG. 2A shows an isometric projection of a butt plate and a quadriceps support assembly.

FIG. 2A, an isometric projection describing the partial assemblage of components of a rigid rod butt plate 20, a rod butt gimbal receiver (cup or raised extension) 21, a horizontal passage way 22, for a partially threaded gimbal securing bolt 23; a butt plate suspension fixture 24 which will be securely attached or integrated to the butt plate; a semi-conical, left quadriceps leg support 25-*l* with attachment bolt holes 26-*l*, and large separation washers 27 which may be contoured to conform with curvatures of left and right quadriceps leg supports; alternate pivot attachment holes 28-*l*; and arced adjustment holes 29-*l*. Said arced attachment adjustment holes provide for setting individual angler leg stances and angular widths. See FIGS. 2B and 2D, below, for descriptions of functions and horizontal separations of 26-*l* & r, 28-*l* & r and 29-*l* & r holes.

Note, "l & r" distinctions designate left and right sides of components, respectively, of matching pairs. Also note, attachment bolts, washers and wing nuts are not separately enumerated, but may be of ¼-inch diameter stainless steel and of sufficient lengths. Also note, only one side of a rigid rod butt plate and quadriceps leg support is detailed in FIG. 2A, but a second, contrasting assemblage is required to complete the rod butt plate and leg support embodiment as diagramed in FIGS. 2B, 2C, and 2D FIG. 2B, a complete frontal elevation of said rigid rod butt plate 20, gimbal receiver 21 and quadriceps legs supports 25-*l* and 25-*r*. Matching pivot attachment hole 28-*l* and arced attachment adjustment hole 29-*l* described in FIG. 2A, along with their counterparts 28-*r* and 29-*r*, require horizontal separations to match the corresponding separations of 26-*l* and 26-*r* shown on FIG. 2D. Anglers of different physical statures and stances may adjust the height and angular positions of the flexible quadriceps plates to match individual comforts and needs.

Figure 2B:
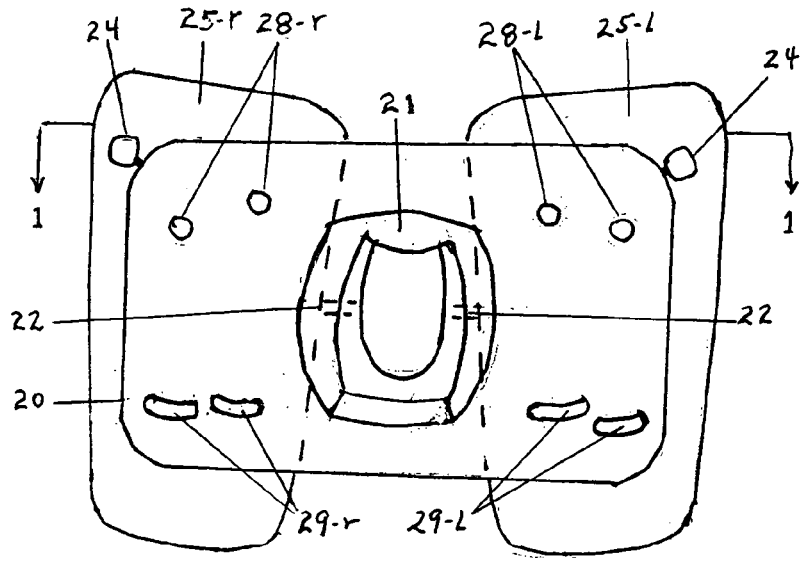
FIG. 2B shows a front elevation view of said butt plate and quadriceps support assembly.
Figure 2C:
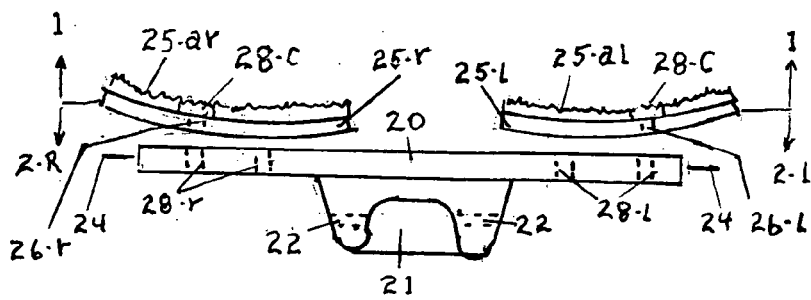
FIG. 2C shows a top elevation view of said butt plate and quadriceps support assembly.

FIG. 2C, a top-down elevation view describing semi-conical flexible left and right leg braces 25-*l* and 25-*r*, with quadriceps cushioning 25-*a*1 and 25-*ar* attached thereto; said flexible leg braces may be molded or cut from approximately 3/16 to ¼ inch thick polyethylene, polystyrene, or similar semi-flexible, marine durable materials. Such materials must withstand moderate flexing without cracking. Each upper curvature radius is greater than each lower curvature radius of said semi-conical flexible leg braces, to conform to an angler's typical upper and lower thigh structure. Said cushioning materials need bolt holes 28-c sufficiently large to allow for holding attaching bolt heads, while tightening to said rod butt plate in FIG. 2A. Said attachment bolts may include flat washers on the face of said butt plate. The attachment bolt ends may be safety capped with vinyl or similar material covers (not diagramed).

Figure 2D:
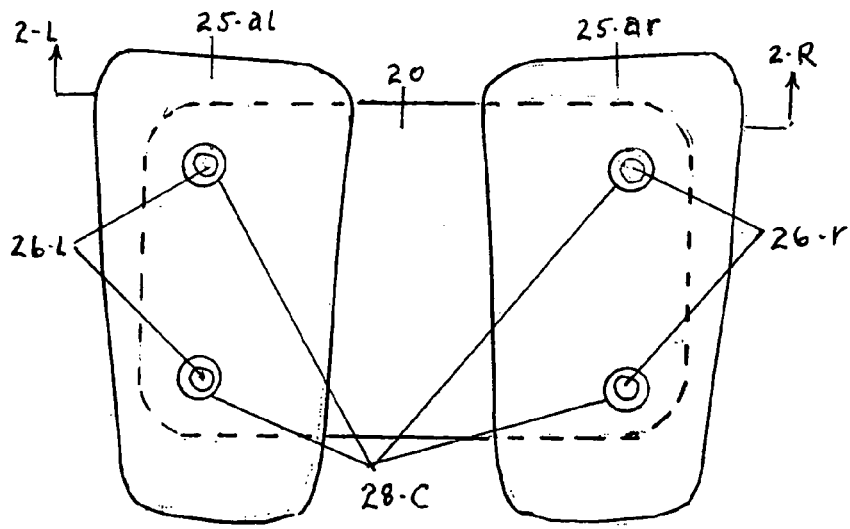
FIG. 2D shows a rear elevation view of a quadriceps support cushioning configuration.

FIG. 2D, a complete rear elevation, the reversed side of FIG. 2B, showing attachment holes 26-l and 26-r and larger bolt head holes 28-c in cushioning material 25-a1 and 25-ar. Aforementioned butt plate 20 and gimbal receiver 21 front side details are not projected in reverse onto FIG. 2D.

Figure 3:
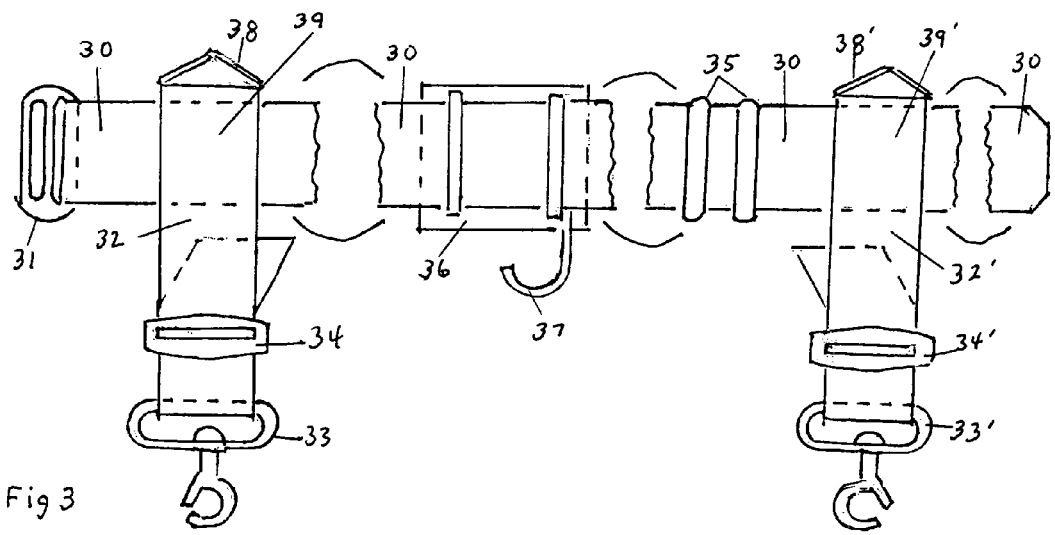
FIG. 3 shows a front view of a waist belt and drop straps components assembly.

FIG. 3, a segmented frontal view of a waist belt 30 and adjustable buckle 31, with two drop straps 32, each holding a swivel attachment clip 33; said drop straps each includes a length adjustment device 34, as well as an affixed suspenders attachment 38 for optional suspenders strap usage. Waist belt and drop straps should be constructed of semi-rigid web belting which may provide enhanced stability to said attached butt plate 20. Said waist belt may include a flexible lower back support plate 36 which may provide a means to attach an accessory hook 37. Said waist belt may also include belt loops 35 for controlling the end of the waist belt passing through the adjustable buckle. The adjustable buckle may be a common self-locking "friction" or a clip-lock function, large enough to hold a web belt width of approximately 2-inches. Upper ends of said drop straps will enwrap said waist belt so as to provide a means for adjustably sliding along the waist belt. Said swivel attachment clips 33 will engage said butt plate suspension fixtures 24. Said belt loops are intended to safely secure a fold-back loose end of the waist belt after the waist belt is drawn tight against an angler's waist. Loose ends of said drop straps extending beyond said length adjustment devices may be safely secured by attachments of Velcro materials. Velcro hook pieces 39 may be affixed to the upper front sections of the drop straps. See FIG. 4 rump-to-reel Velcro pieces 47 for functionality.

Figure 4:
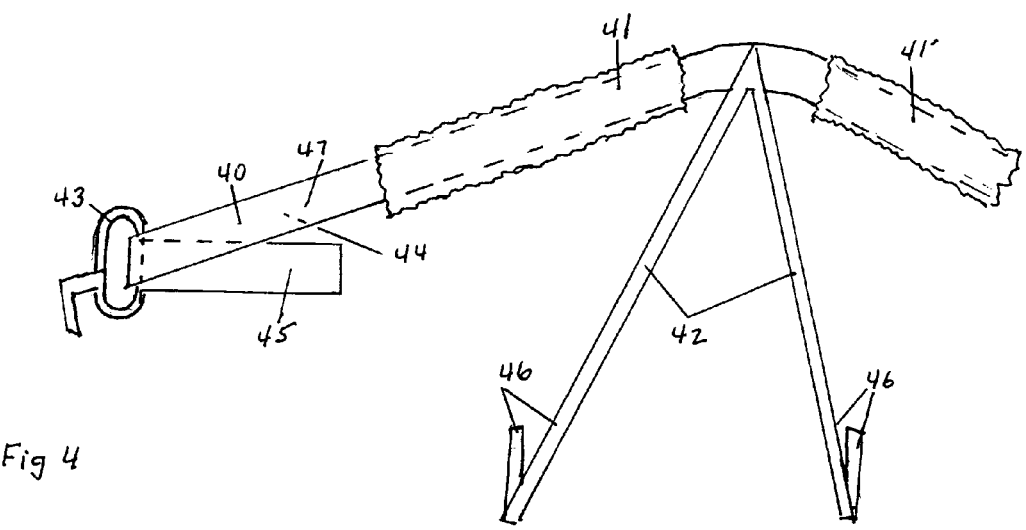
FIG. 4 shows an isometric projection of a padded rump-to-reel strap, showing one quick release reel lug fastener and a groin straps assembly.

FIG. 4, a detailed components diagram of a rump-to-reel cushioned fighting belt 40, which provides a leveraged pull against a fishing rod and reel rig. Cushioning material 41 and 41', affixed to two fighting belt sections, should be wider than width of said fighting belt material itself. The added width of cushioning is for comfort and personal protection to an angler. Pulling resistance, against an angler's rump and hips, is strong and nearly constant while fish-fighting in this Harness Set embodiment. Cushioning material should extend a sufficient length to cover an angler's hips, as great rump-to-reel belt pressure while fish-fighting may aggravate the angler's hips if left without cushioning. Lengthy Velcro hook strips 44 are permanently attached to both outside sections of said rump-to-reel belt and serve with shorter permanently attached Velcro loop strips 45 for rapid and precise belt length adjustments. A looped swivel or similar fishing reel lug clip 43 rides freely near each end of the rump-to-reel belt. Importantly, said fishing reel lug clips must allow for a quick release from fishing reel lugs. A center section of said rump-to-reel belt is void of cushioning material and is reserved for angularly attaching groin straps 42. Ends of said groin straps will enwrap the rump-to-reel belt near each fishing reel lug clip, and be secured by Velcro materials 46. Said groin straps, not intended to encounter strong pulling stresses, serve primarily to hold said rump-to-reel fighting belt in an optimum position below an angler's rump. Importantly, said rump-to-reel fighting belt needs to be drawn evenly tight against each fishing reel lug, as a means to squarely and perpendicularly hold the fishing rod and reel rig very near the angler's chest when not under fish-fighting stress. Velcro loop pieces 47 may be attached to the inside of, and near said cushioning of, the rump-to-reel belt for holding said rump-to-reel belt from falling off an angler when the Harness Set is not engaged to a rod and reel rig. (See FIG. 3 drop straps 39 detail). Note: only one end of the rump-to-reel belt is diagrammed, but each end is similar in content and construction.

Note: Overall and functional lengths of the rump-to-reel and waist belts should be sufficient to fit an angler with a girth of up to 50 inches. Accordingly, an alternative rump-to-reel belt 40 and a waist belt 30 with buckle 31 may be included with the Harness Set for an angler with a lesser girth, perhaps up to 36 inches.

Figure 5:
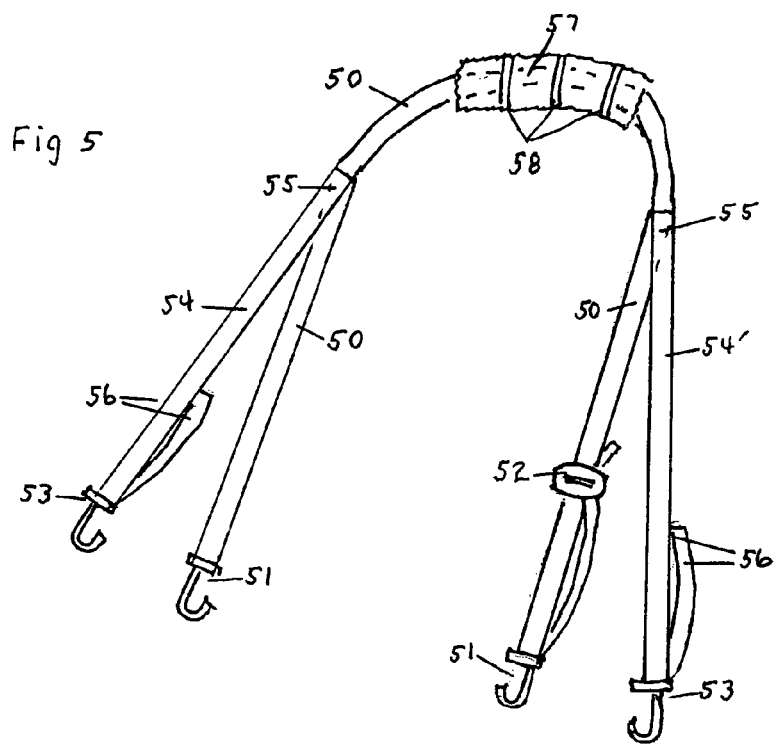
FIG. 5 shows a general projection of a padded suspenders strap with alternative connections.

FIG. 5, a cushioned and adjustable suspenders strap 50, in length sufficient to serve a tall angler, is designed to add support and stability to said waist belt and said drop straps. An alternate and preferred function is to provide additional pull against the rod and reel rig by connecting said suspenders strap's clips 51 to base loops of said quick release fishing reel lug clips 43. See FIG. 4. Said suspenders strap is not intended to encounter strong pulling stresses and may rely on attachment clips of strength less than required for the rump-to-reel fighting belt 43, or said butt plate attachment clips on the drop straps 33. One attachment clip 51 may be permanently affixed to one end of said suspenders strap, while a second attachment clip 51 floats on said suspenders strap in an adjustable length loop. Length of the adjustable loop is controlled by a friction buckle 52 which is affixed to that end of the suspenders strap. Optionally, both waist belt stability and additional pull on a rod and reel rig may be achieved by adding auxiliary suspenders straps 54 and 54' with floating attachment clips 53 in end loops secured by Velcro materials 56. Said auxiliary suspender straps 54 and 54' may be joined to the primary suspenders strap 50 with Velcro or other attachment materials 55. Neck cushioning material 57, wider than said suspenders strap, may be adjoined to the suspenders strap by a plurality of belt loops 58 affixed to said neck cushioning material. In either suspenders strap optional use, an angler's upper body should remain erect in a preferred "head-up" fishing-fighting posture to avoid an upper back strain.

Figure 6:
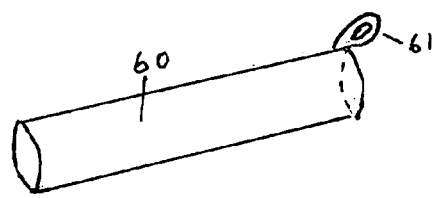
FIG. 6 shows an isometric view of a fishing rod butt extension tube.

FIG. 6, an optional accessory fishing rod butt extension tube, background: Some big game fish, for example, large adult blue or yellow finned tuna and occasionally billfish, usually attack bait fish and fishing lures at or near the water's surface. Such fish may make one or more rapid and lengthy swims in random directions near the water's surface before sounding to great depths. When fighting fish near the surface, said Harness Set serves as a primary fishing rod and reel leverage system. An angler may retain a fishing rod and reel rig in the Harness Set and pull hands free against the large game fish. When such game fish sounds, however, an angler gains a greater lift by leveraging the fishing rod and reel rig horizontally on the fishing boat deck rail. An angler's challenge now becomes an issue of steadying the fishing rod's short butt section inside the fishing boat deck rail while winding the fishing reel crank. Typically, the angler straddles the small diameter fishing rod butt in an understandably uncomfortable strain of the angler's groin area.

Simple, practical but unobvious solution to this issue: a polyvinyl chloride "Schedule-40" or similar tubing 60, of approximate inside diameter 1½ inches, with an attached eye 61. The fishing rod butt is inserted into said tube to temporarily increase said fishing rod butt length and diameter. The angler then straddles the tube-enhanced fishing rod butt while gaining increased leverage from the extended length, and an increased comfort of, an enlarged rod butt diameter. Said rod butt extension tube, carried on an accessory hook 37 shown on FIG. 3, will be readily accessible and available for use when needed in this stage of the fish fight.

Figure 7:
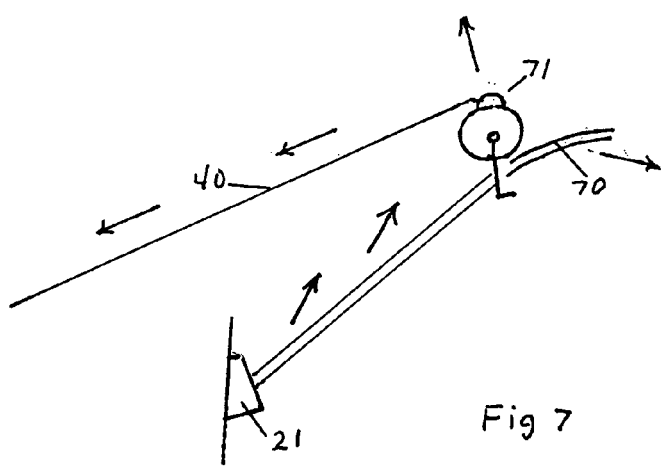
FIG. 7 shows a side view analysis of aggregate forces under stresses during a fish fight, i.e.
 fish pulling fishing rod away from an angler,
 fishing rod butt being pushed away from said angler during a drop-down knee bend, and
 fishing rod and reel being pulled toward said angler by stress on rump-to-reel strap during the drop-down knee bend.

FIG. 7, a systematic diagram of forces and resistances, shows said gimbal receiver 21 pressed forward and upward by an angler's knee bend, pushing a fishing rod and reel rig 70 forward and upward, while a fighting game fish pulls the fishing rod down and away from the angler. Simultaneously with the knee bend, the angler drops down against the rump-to-reel belt and exerts great strain against the fishing reel lugs, causing the fishing rod and reel rig to pivot upward at the gimbal fulcrum point. All results in the fish being leveraged toward the fishing boat. In transitioning from a stand-up Harness Set method to leveraging on the fishing boat rail, with or without a rod but extension tube, the angler is advised to first quickly remove the butt plate and thigh support assembly from said drop straps swivel attachment clips thereby enabling the angler to comfortably and safely straddle the fishing rod butt end.

The preceding descriptions and explanations and the accompanying Claims, Abstract, and diagrams concerning the components of a Compact Flexible Stand-up Fish Fighting Harness Set (Harness Set) are submitted with the inventor's understanding of possible modifications by other parties in the future, but which may not depart from the essential design and integrity of this Harness Set.

I claim that what is novel and unobvious, and desired to be protected for the aforementioned Harness Set, is included among the following:

1. A fish fighting harness set comprising:
   Two semi-conical quadriceps support components being generally congruent to right and left thigh structures of an angler and constructed
   from a semi-rigid flexible material, each semi conical quadriceps support further comprising:
   an upper radii and a lower radii in which said upper radii is greater than said lower radii;
   at least two vertically spaced attachment holes extending there through;
   an inner surface having a cushioning material attached with marine durable bonding agents or other devices for cushioning the angler's quadriceps, said two semi conical quadriceps support components being attached to
   a substantially rectangular and planar contoured rigid base, said rigid base being substantially symmetrical about a center line, and having an attachment device on its upper exterior edges;
   said rigid base having at least one fixed pivot hole and at least one crescent attachment hole vertically spaced from each other on either side of said center line for adjustably attaching and pivoting each of said semi-conical quadriceps supports with respect to said rigid base;
   each of said semi-conical quadriceps support components attached to said rigid base by two attachment devices,
   said first attachment device extending through the aligned holes of a) the top hole of the quad support and b) the top fixed hole of the rigid base
   said second attachment device extending through the aligned holes of a) the bottom hole of the quad support and b) the crescent hole of the rigid plate
   said rigid base further comprising a fishing rod butt receiver member, containing therein a horizontally aligned device to receive and engage a fishing rod butt gimbal and hold said rod at a variable acute angle from vertical;
   said rigid base being vertically suspended from connection devices at ends of adjustable drop straps;
   said adjustable drop straps being suspended from an adjustable waist belt;
   said adjustable drop straps including attachment members for connecting a suspenders strap
   said adjustable waist belt including at least one waist belt loop to safely secure a loose end of the adjustable waist belt, and
   said at least one waist belt loop including an accessory holding device.

2. The fish fighting harness set of claim 1, further comprising a cushioned adjustable length rump to reel belt comprising:
   quick-release fishing reel lug connectors, and;
   angularly attached adjustable groin straps.

3. The fish fighting harness set of claim 2, further comprising length adjustable suspender straps providing connectors for attachment to said waist belt or said rump to reel belt.

4. The fish fighting harness set of claim 1, wherein the accessory holding device comprises a connection for attachment of a fishing rod butt extension tube.

* * * * *